J. ESPOSITO.

PEA-NUT ROASTER.

No. 7,397. Reissued Nov. 21, 1876.

Witnesses:

A. Moragas

Ernest E. Webb

Inventor:

Jean Esposito by his attorney

A. v. Briesen

THE GRAPHIC CO. N.Y.

UNITED STATES PATENT OFFICE.

JEAN ESPOSITO, OF NEW YORK, N. Y.

IMPROVEMENT IN PEA-NUT ROASTERS.

Specification forming part of Letters Patent No. 181,324, dated August 22, 1876; reissue No. 7,397, dated November 21, 1876; application filed October 26, 1876.

*To all whom it may concern:*

Figure 1:
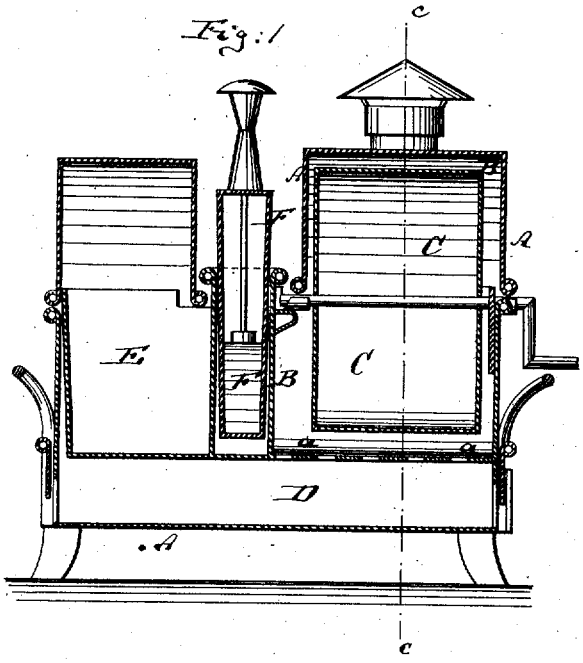
Figure 2:
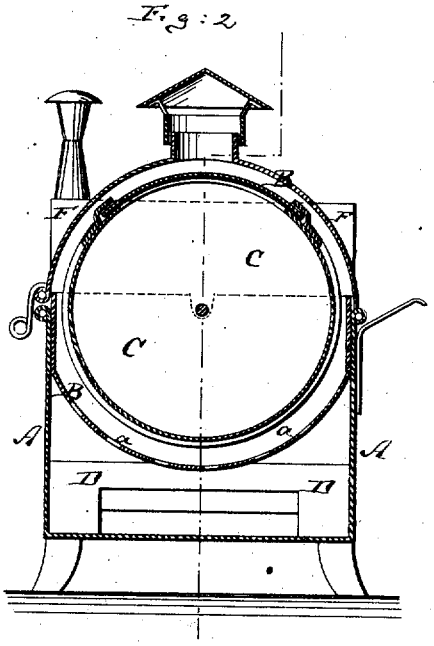

Be it known that I, JEAN ESPOSITO, of New York city, in the county and State of New York, have invented a new and Improved Pea-Nut Roaster, of which the following is a specification:

Figure 1 represents a vertical longitudinal section of my improved pea-nut roaster; Fig. 2, a vertical transverse section thereof on the line *c c*, Fig. 1.

Similar letters of reference indicate corresponding parts in both figures.

This invention relates to a new draft arrangement, and to a new arrangement of water-chamber, and other features of improvement in a pea-nut roaster, all of which are hereinafter more fully described.

In the drawing, the letter A represents the outer casing of my improved pea-nut roaster, placed on legs in the customary manner. Within this casing is formed the roasting-chamber B, and near the same the storage-chamber E. The roasting-chamber contains a cylinder or drum, C, into which the pea-nuts to be roasted are placed. The fuel used for roasting is placed upon a perforated plate or grate, *a*, which is formed within the chamber B under the drum or cylinder C. Under this grate is the ash-chamber D, which I extend to and beneath the storage-chamber E, and which constitutes a sort of draft-channel, partly warming the storage-chamber. Registers are at the ends of passage D for regulating the draft. The top of the chamber B has an opening for the escape of the products of combustion. Between the chambers B and E I place a water receptacle or tank, F, which is provided with a suitable opening for filling. A steam-whistle may also be placed therein, as well as a float carrying a guide-rod for indicating the quantity of water in the tank. The storage-chamber has a hinged cover, so the pea-nuts may be inserted after roasting.

The pea-nuts are, in this storage-chamber, not exposed to the direct heat of the fire, being only heated to some extent by the heat in the ash or draft chamber at the bottom of the roaster, and by the heat of the water-tank. The tank prevents the heat on the grate from acting directly on the roasted pea-nuts in the storage-chamber, and produces in said storage-chamber the requisite temperature, keeping the pea-nuts in good condition for eating.

After the pea-nuts are roasted they are transferred from the drum to the storage-chamber, and there kept warm until sold.

The improved roaster facilitates not only the roasting of the pea-nuts to the exact condition required, but also enables the vender to keep them a proper length of time in the most salable condition without any extra trouble or expense.

The water-tank, it will be seen, stands in vertical position between the roasting-chamber and the storage-chamber, and is vertically removable. When it is removed the storage-chamber will receive a larger proportion of heat.

I claim as my invention—

1. A pea-nut roaster having the bottom of the roasting-chamber B on a plane with the bottom of the water-chamber, and with the bottom of the storage-chamber E, substantially as herein shown and described.

2. A pea-nut roaster composed of a vertical roasting-chamber, B, having a horizontal grate, and of the vertical storage-chamber E, said chambers being placed at a distance apart to admit a vertical water-tank, F, between their walls, substantially as herein shown and described.

3. The removable water-tank F, placed vertically between, and combined with, the roasting and storage chambers B and E of a pea-nut roaster, substantially as described.

4. In a nut-roaster, the combination of the chambers B, F, and E, which are placed side by side, with the draft-passage D, which extends beneath the bottom that unites them, substantially as herein shown and described.

JEAN ESPOSITO.

Witnesses:

ERNEST C. WEBB,

F. V. BRIESEN.